(12) United States Patent
Bunnel

(10) Patent No.: X9195
(45) Date of Patent: Oct. 27, 1835

(54) STONE, SAW MILL

(76) Inventor: Daniel Bunnel

Daniel Bunnel Xenia . Ohio

Letters Patent

The Schedule refered to in these Letters Patent and making part
of the same containing a description in the words of the said Daniel
Bunnel himself of his improvement in the mill for sawing stone To all to whom these presents shall come:. Be it Known
that I Daniel Bunnel of Xenia in the County of Greene and State of
Ohio. have invented a new and useful machine for cutting Stone
and the following is a full and exact description thereof, to wit 1st
A shaft made of iron or other material the thickness and length of
which must depend upon the number of saws and power used. with
offsetts or allongs to draw the carriages by means of pitmen having
joints at each end. 2d The carriage frame to be of wood 6 by 2
inches square 10 feet long more or less as the stone may require. and
3 feet in width with four posts 2 feet 6 inches high. 6 by 2 inches
square with 1 brace at each post the top and rails 1/2 by 3 inches
width. a space with a half an inch between the two rails above
and the two rails below - through which moveable bells go to be confined
by screws or other means to guage [illegible] in the frame
with 4 wheels of iron or other material supporting the carriage and
running on a rail way. 3d The length of the saw frame in propor
tion to the carriage. the height 4 feet more or less as the thickness of
the stone may require with a [illegible] in the middle and rod of iron
at the top by which the saw made of soft iron is strained by
a screw or other means. In testimony whereof I have hereunto
set my Hand this Eighth day of August in the year of our Lord
One thousand Eight hundred and thirty five Witnesses Daniel Bunnel
Josiah Davison
Saml Harris 378 wds (Patented October 27. 1835.)

[illegible]